United States Patent [19]  [11] 4,353,837
Barns  [45] Oct. 12, 1982

[54] METHOD FOR CONTINUOUS AZEOTROPIC PROCESSING OF VEGETABLE AND PROTEIN MATERIAL

[76] Inventor: Roy W. Barns, P.O. Box 215-B, R.R. 1, Broadway, Va. 22815

[21] Appl. No.: 251,547

[22] Filed: Apr. 6, 1981

Related U.S. Application Data

[63] Continuation-in-part of Ser. No. 14,090, Feb. 22, 1979, Pat. No. 4,260,457, which is a continuation-in-part of Ser. No. 807,021, May 31, 1977, abandoned, which is a continuation-in-part of Ser. No. 550,157, Feb. 14, 1975, abandoned.

[51] Int. Cl.³ .......................... B01D 3/36; C11B 1/10
[52] U.S. Cl. ................................ 260/412.4; 203/43; 260/412.8
[58] Field of Search .......................... 260/412.8, 412.4; 422/269; 202/168–170; 203/43–46

[56] References Cited

U.S. PATENT DOCUMENTS 2,112,805  3/1938  Bonotto .......................... 260/412.8
3,867,416  2/1975  Barns ............................. 260/412.8

Primary Examiner—Frank Sever
Attorney, Agent, or Firm—Shlesinger, Arkwright, Garvey & Dinsmore

[57] ABSTRACT

A method for continuous azeotropic processing of vegetable and protein material provides for staged processing, separate dehydration, and flash desolventizing.

11 Claims, 6 Drawing Figures

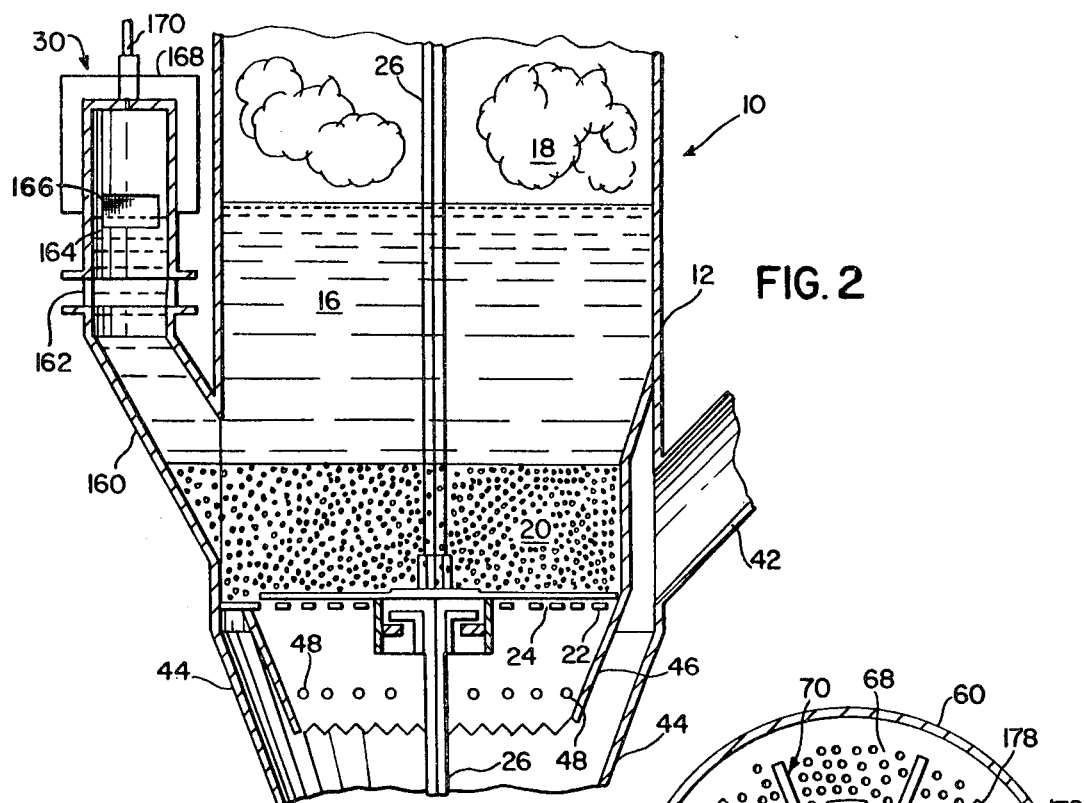
FIG. 2
FIG. 3
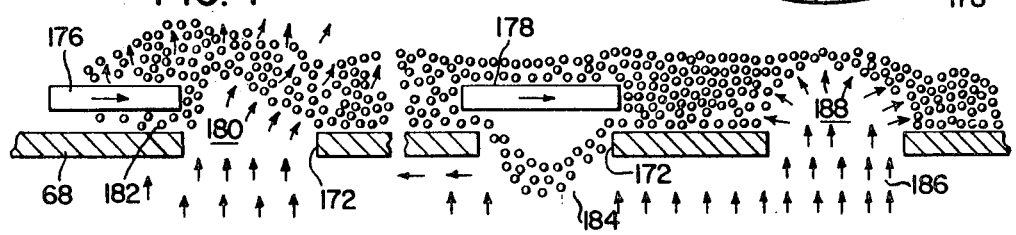
FIG. 4
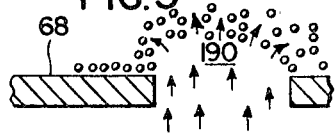
FIG. 5
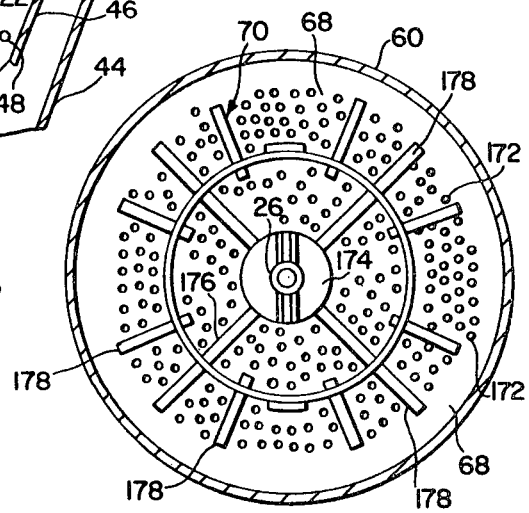
FIG. 6

METHOD FOR CONTINUOUS AZEOTROPIC PROCESSING OF VEGETABLE AND PROTEIN MATERIAL

BACKGROUND OF INVENTION

This invention relates to an azeotropic process for obtaining oil and high protein product from animal, fish, or vegetable material. This application is a continuation-in-part of co-pending application Ser. No. 014,090, filed Feb. 22, 1979, now U.S. Pat. No. 4,260,457, which is a continuation-in-part of Ser. No. 05/807,021 filed May 31, 1977, now abandoned, which is a continuation-in-part of Ser. No. 05/550,157, filed Feb. 14, 1975, now abandoned.

This invention is an improvement over the column azeotropic extraction unit disclosed in my previously issued U.S. Pat. No. 3,867,416, dated Feb. 18, 1975. This patent introduced the use of a series of vertically spaced fluidized beds through which solvent vapor was passed upwardly through the column in counterflow to descending solid particles which passed through plates supporting the beds. The vapor, preferably superheated, picks up oil and moisture from the material during the course of its travel from the bottom to the top of the column. A liquid pool of miscella containing oils removed from the particles, and liquid solvent from vapor which has condensed during the course of the process is removed from the top of the column, while the dried marc of flour-like consistency from which the oil and moisture has been removed by the solvent vapor, is taken from the bottom of the column.

A balance of upward vapor velocity, particle size and quantity of material, and heat and moisture balance throughout the length of the column, is necessary to bring about this result, as particularly set forth in the description of Barns U.S. Pat. No. 3,867,416. Maintaining these conditions imposed a severe limitation on preparation of the column, and restricted output of the column.

SUMMARY AND FEATURES OF INVENTION

Accordingly, it is a principal feature of this invention to improve upon the existing azeotropic column design methods, particularly the azeotropic extraction column of Barns U.S. Pat. No. 3,867,416.

It is a further feature of this invention to provide an azeo-extraction process which gives a significant increase in capacity for a given size unit.

A still further feature of the invention is to bring about more effective control of conditions within the column.

A still further object of the invention is to provide a column process which has distinct sections in which a given operation can be more effectively carried out than heretofore.

It is a still further object of this invention to provide an improvement in column techniques in which the dehydration load within the column is divided and more effectively handled.

Another feature of this invention is an improved method of promoting downward settling of the particles of the beds through the column.

Another feature of the invention is the provision of an improved feed technique which creates a more desirable particle for the fluidized beds of the column.

A still further feature of this invention is the provision of an improved non-clogging miscella removal technique for the column.

A still further feature of this invention is the provision of an auxiliary vapor feed technique to readily remove unbound moisture.

A still further feature of this invention is the improved regulation of upward solvent vapor flow to permit better downward settling of the particles.

A still further feature of this invention is the more effective transport and desolventizing of the dried material which leaves the bottom of the column.

A still further feature of this invention is the providing of an extraction column which requires less auxiliary equipment than possible heretofore.

DESCRIPTION OF THE DRAWINGS

FIG. 2 is an enlarged cross-sectional view of the upper section of the extractor column of FIG. 1.

FIG. 3 is a horizontal section taken through the column above one of the plate and valve assemblies.

FIG. 4 is a partial cross-sectional view of a section of a typical plate showing interaction of the valve and upward vapor stream.

FIGS. 5 and 6 are partial views of a typical section of one of the columns illustrating the action of pulsed vapor flow.

DESCRIPTION OF THE INVENTION

Figure 1:
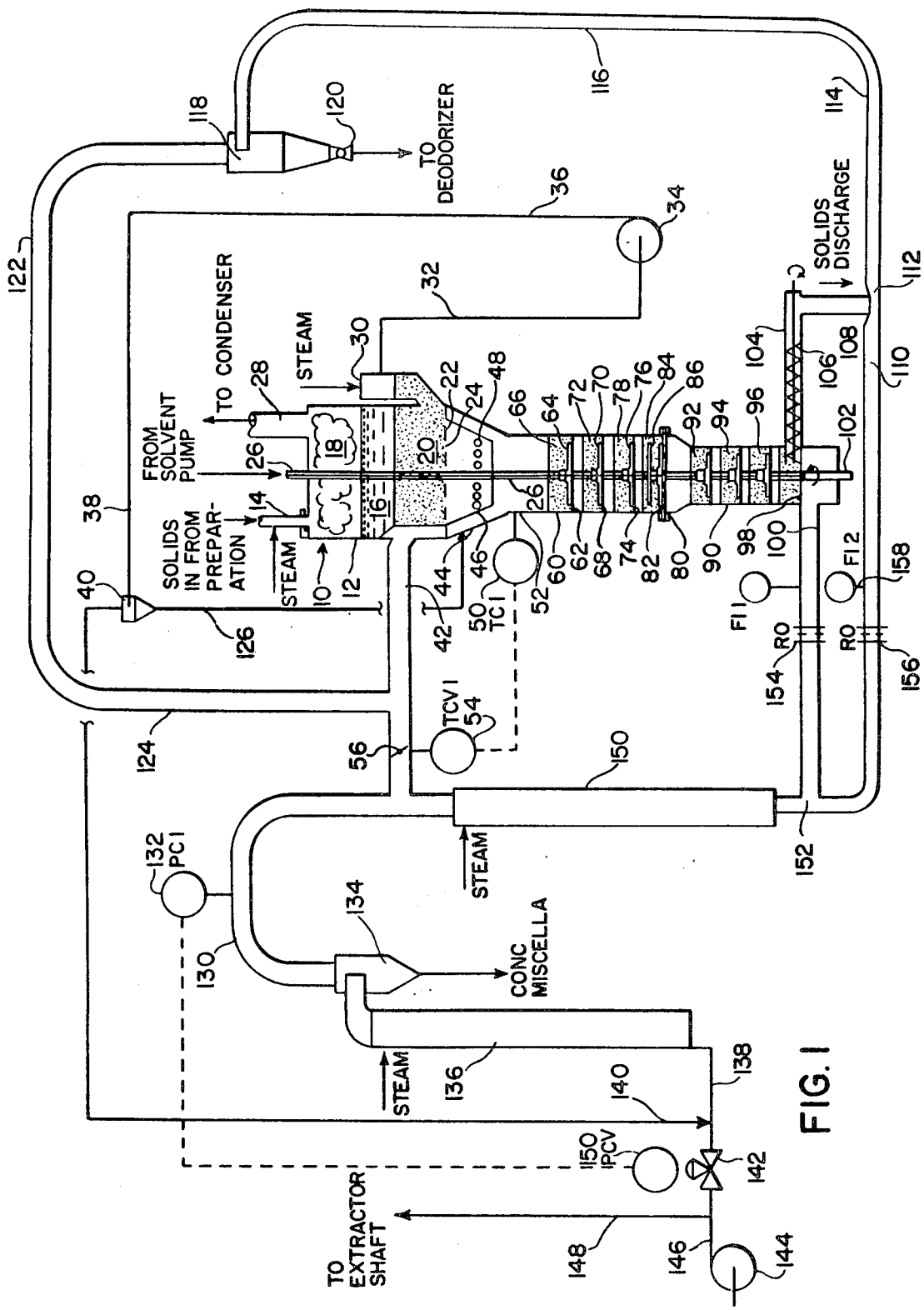
FIG. 1 is a schematic view showing the azeotropic extraction system, showing in cross section the extractor column.

Referring to FIG. 1, the extractor column generally indicated at 10 is an elongated continuous structure which has three principal section. The upper dehydration section 12 has the largest diameter and is the section in which unbound water is removed from the feed. The feed is introduced at the top of the dehydration section through the inlet 14 and into the pool of liquid miscella 16 which contains the liquefied solvent vapor and oils removed from the feed.

Immediately above the azeotropic liquid miscella pool 16 is an active turbulent area 18 containing a mixture of solvent and water vapor. The pool of miscella is in a continual state of turbulent boiling and bubbling.

The uppermost bed 20 which extends across the top section of the column is supported on a perforated metal plate 22. The bed consists of an accumulation of feed particles which are in a continuous moving state. The movement of the feed particles in the bed is brought about by the upward travel of solvent vapor through a plurality of perforations 24 in the plate 22. FIG. 2 shows in greater detail the arrangement in this dehydration section. Turbulence created at 18 above the miscella pool 16 is caused by the very rapid passage of solvent vapors through the openings 24 in the plate 22 and upwardly through the bed of feed particles 20 and the miscella pool 16 to produce the roaring, turbulent, surging condition in the miscella pool.

The hollow shaft 26 extends downwardly through the center of the column and supports a plurality of rotating blades such that one blade is supported in a plane of rotation slightly above each of the plates in the column. The blades are both supported above each of the plates in the column, and are rotated by the hollow shaft 26. An upper set of blades 25 is disposed above the plate 22 and slightly spaced from its upper surface. A bearing support assembly 27 shown in FIG. 2 supports the hollow rod 26 within the column.

All of the water removed in vapor form with the required solvent vapor is taken from the top of the column through the exhaust conduit 28 which is connected to the condenser.

A miscella takeoff assembly generally indicated at 30 is located externally of the column and contains a screen assembly through which the miscella is passed along line 32 to the miscella pump 34 and upwardly and across line 38 to the liquid clarifier unit 40.

The solvent vapor supply line 42 is directly connected to the upper section of the column 12 and supplies the largest percentage of solvent vapor to the unit. It is supplied to the transition portion of the dehydration section, which is the reduced section which constitutes the inwardly flared section 44. The vapor passes down below the skirt 46 and up into the column, as well as through the row of plural openings 48 immediately below the upper perforated plate 22 for the bed 20.

In this section the temperature control sensor 50 is located as shown schematically in FIG. 1 and is positioned at 52. It controls the temperature control valve 54 which has a butterfly valve 56 in the vapor supply line 58. This is opened and shut according to the temperature of the azeotrope at this point in the column.

The intermediate section of the column includes an extraction section 60 of reduced diameter in which the perforated plate 62, similar to perforated plate 22, extends across the column immediately below a blade assembly 64 rotatably mounted on shaft 26. A fluidized bed 66 of feed particles is disposed and supported above the perforated plate 62.

As required, other fluidized beds of feed material are disposed immediately below bed 66 above the extraction section. As shown in FIG. 1, a perforated plate 68 having a rotatable blade assembly 70 disposed above it supports a fluidized bed 72. Similarly, perforated plate 74 and rotatable blade assembly are disposed at the bottom of the fluidized bed 78. At the lower end of the extraction section a lowermost perforated plate 80 supports a fluidized bed 84 of feed particles and has rotatable blade assembly 86 disposed slightly above it for rotation with the shaft 26.

In this section, there is an additional rotating assembly 86 which has hollow elements, the interior of which are connected to the central hollow portion of the shaft 26. This assembly forms a conduit for fresh liquid solvent to be supplied to the lower portion of the extraction section of the column. The hollow assembly 86 rotates with the shaft 26 to evenly dispense liquid solvent to this portion of the column. It is carried upwardly through the other beds by the solvent vapor which is introduced at the bottom of the column and will be discussed hereafter.

The stripping section 90 is the narrowest section of the column and has three successive fluidized beds 92, 94, and 96. It is supported by perforated plates and also has a rotating blade assembly connected to the central hollow shaft 26.

The lowermost plate supports the lowest bed of particulate material in the discharge section. A rotating sweeper arms assembly, not shown, moves the material from this plate into the auger casing 104 which has a double flight conveyor section 106. It should be noted that the auger and flight assembly provide a sealing arrangement from the lower part of the column by use of a plug seal technique in which several of the flights are left off and the accumulated material in that space serves as a sealing plug.

The perforated plate 98 serves to support the lowermost bed of dried material which leaves the stripping section.

The superheated vapor is introduced to the bottom of the column along line 100 and flows up through the perforations in the perforated plate 98. It should be noted that the material is moved across the plate to the conveyor by a rotating blade assembly connected to the shaft which is not shown. The rotating shaft 26 has its bottom end connected to a rotating drive assembly, not shown.

Solids are discharged from the conveyor through the vertical depending tube 108 to the reduced diameter acceleration section 112 of the superheated solvent vapor supply line 110.

The superheated vapor traveling along the line 110 is under pressure and on reaching the reduced section 112 picks up velocity and entrains in the accelerated stream of superheated vapor, the marc or flour-like material, carried from the lowermost bed of the column by the conveyor 104.

The superheated solvent vapor traveling along line 110 with the entrained material is carried along pipe line 114 and upward vertically through section 116 to the centrifugal separator 118. The solids are separated out and discharged through the lower valve 120 of the cyclone separator to the deodorizer and final processing.

The section of the line from 112, including 114 and 116, comprises what is known as a flash desolventizing section. It acts to further dry the material coming from the bottom of the column by removing the solvent that remains in the material. The superheated solvent vapor acting upon the smaller amount of material containing some condensed liquid solvent acts to vaporize it and in so doing dries the material prior to its arrival at the cyclone separator 118.

The superheated solvent vapor, together with some vaporized solvent obtained from the solid material dropped into line 110 by the conveyor travels along line 122 and is carried downward through line 124 to be returned to the upper dehydration section of the column by line 42.

This feature permits a large volume of superheated solvent vapor to be introduced to the column at a critical point in the process and produces most of the dehydration.

In the upper dehydration section 12 of the column, most of the water is unbound water, which is readily evaporated in a very rapid process.

Below this point, the water is termed bound water, in that it is within the particulate material cellular structure itself, and requires a long exposure time to solvent vapor and liquid solvent action.

The bulk of the superheated vapor required for the process is used in this dehydration section, performing the dehydration of unbound water and carrying it upward through the top bed 20, miscella pool 16, and out the line 28 to the condenser.

The line 126 shown running downwardly from the liquid cyclone separator 40 contains some solids that were picked up in the miscella stream and returned to the transition section of the dehydration portion 12 of the column.

Vapor supply line 130 has a pressure sensing element 132 which acts to control vapor flow therethrough as a supplement for the vapor supplied along line 42 from the flash desolventizing system coming from line 124.

When the temperature drops to a point slightly above the azeotropic boiling point and is sensed by the sensing element 50 at 52, the temperature control valve opens, supplying additional solvent vapor along line 130 to offset the increased dehydration load and to assist in raising the temperature in the column at point 52 to the desired temperature (above).

A sensing element 132 is located in line 130 and this controls the flow of vapor from the evaporator-separator 134.

The evaporator-separator 134 acts to separate the concentrated miscella and remove it from the stream, permitting liquid free solvent vapor to enter line 130.

The long tube evaporator 136 receives the miscella from the overflow of the liquid cyclone 40 along lines 138 and 140 and concentrates the miscella from fifteen to twenty percent oil to a range of fifty to seventy percent oil.

Valve 142 supplies additional solvent from line 146 and pump 144 from a solvent storage to supplement the liquid solvent required to provide the vapor needed in line 130. Line 146 supplies liquid solvent along line 148 which is supplied directly to the hollow rotating shaft 26.

It should be noted that the entire system is essentially self-contained, in that the bulk of the vapor and solvent vapor is recirculated, either directly or after separation from other constituents. The highest dehydration load is in the top dehydration section 12 of the column, and three-quarters approximately of the solvent vapor is supplied at this point to remove the unbound water.

The flow of solvent vapor along line 130 that is not supplied directly to the upper dehydration section 12 of the column returns to the superheater 150 to which heat input is supplied via the steam line indicated at the arrow. Superheated volvent vapor leaves the superheater by line 152 and is supplied directly to the bottom of the column by way of line 100 through the restrictive orifice 154. The restrictive orifice acts to restrict the flow to a desired quantity to be supplied to the bottom of the column on a sustained steady flow basis.

Flow indicator 158 (generally designated as F12) indicates the flow through the line 110. Depending upon moisture content of the feed materials and other factors, this flow will be increased or decreased. However, it is approximately two to five times the flow of solvent vapor that is introduced in the bottom of the column.

Referring to FIG. 2, an enlarged sectional view from the opposite direction shown in the overall system schematic is shown, in which the upper fluidized bed 20 supports a pool of miscella 16.

The takeoff assembly 30, is mounted externally of the extractor column, and is connected thereto through a downwardly extending flanged conduit 160 through a heat sealing element 162.

The casing 164 includes a rectangular screen 166, which is positioned even with the upper surface level of the miscella pool. This screen is vibrated by mechanical means (not shown) to preclude clogging thereof. In addition, a steam line 170 is connected to the interior of the miscella takeoff housing through a fine orifice to keep a vapor at the screen on the water side of the azeotrope to preclude dehydration and consequent glazing of the screen surface. The miscella flows through the screen and is connected through a housing flange connection, now shown, to the take-off line 32 of FIG. 1.

FIG. 3 shows a typical cross section of the column in plan view looking downwardly on the perforated plates and the rotating blade assembly. In this instance, however, the section is taken through the central extractor section 60 above perforated plate 68 and the rotating blade assembly 70. The plurality of openings 172 are disposed throughout the entire area of the plate, and the blades 176 which are generally of flat, rectangular configuration extend outwardly from the hub 174, the latter being attached to the hollow rotating shaft 26. Additional intermediate blades 178 supported on a ring fastened to the blades 176 fill the intermediate quadrant between the principal blades 176. It should be noted that this type of configuration is used for large diameter column design, while a small four-blade assembly would be sufficient for a smaller column diameter design.

The valve action of the rotating blades is shown in FIG. 4 which is a partial section of the perforated plate 68. Note that the blades 176 are slightly spaced from the upper surface of the perforate plate 68 and that their width is sufficient to fully cover the opening 17. It has been determined that this is essential, in that the blade passing over the opening acts as a valve to assist in settling of the particles through the openings. This results from the cutoff of the upward flow of vapor through the openings 172. When this cutoff occurs, the particles tend to drop through the openings 172 to the fluidized bed immediately below it. As seen in the first opening, the pocket 180 begins to collapse because the velocity of the vapor which is below the so-called terminal velocity is reduced below that value and the particles drop. The pocket 188 at the right opening of FIG. 4 shows the supported condition in which the uninterrupted vapor flow 186 through the opening proceeds at a sufficient velocity to support the particles thereabove and to create the pocket 188.

FIGS. 5 and 6 are directed to a pulse technique of vapor flow which is also of interest from the standpoint of particle settling through the openings and from bed to bed. In FIG. 5, the terminal velocity is shown as being sufficient to create and sustain the pocket 190, while in FIG. 6, the condition shown at 192 is one in which the terminal velocity of the vapor passing through the opening has been reduced below the terminal velocity and the particles have started to settle through the opening. This can be accomplished by systematically increasing and decreasing the vapor velocity flowing through the perforated plate openings, such that the lower vapor pressure supplies a vapor velocity below the terminal velocity, permitting collapse of the pressure pockets above the plate and settling of the particles through the plate openings. However, it should be kept in mind that the lower limit of the vapor velocity is the fluidizing velocity, inasmuch as the beds have to be maintained in a fluidized state by passing sufficient vapor upwardly through them to keep them in a state of particle movement. The pulsing can be accomplished by periodically reducing the supply pressure in the line 100.

Although not directly shown, it is important that the feed, particularly if seed material is being used, be finely ground and mixed with ten to twenty percent water. This paste is then forced through a die having openings approximately one-eighth of an inch in diameter with a direct feed into the top of the column through line 14. Due to the very turbulent conditions in the atmosphere 18 above the miscella pool 16, and the turbulence within the miscella pool itself, the extruded feed material breaks up into small spherical aggregates approximately one-eighth of an inch in diameter. The reason for the grinding, particularly with vegetable seeds is to promote exposure of the glutinous material to water to increase agglomeration followed by rapid dehydration in the top of the column which causes coagulation. The ph should also be kept in the 6-10 range.

With respect to the column design, it should be noted that the superficial velocity, that is the average cross-sectional velocity of the vapor upward through the column, is varied by changes in column diameter. This is an advantage of this column design in that the single flow of solvent vapor from the bottom of the column upwardly through it with a single starting velocity as a limiting factor, can be varied by changes in cross-sectional area of the column to either increase or decrease the velocity and the treatment time in each of the sections.

It should also be borne in mind that for a typical operation, about three times the amount of solvent is passed through the line 42 as against the superheated vapor passed through the line 100 at the bottom of the column. This is because the greatest dehydration load is at the top of the column where unbound water is to be removed. With the recognition of this concept, and the tie-in of the solvent line from the flash desolventizing system, it is possible to increase the capacity of the column by a factor of three to five fold.

In addition, a steady state of vapor flow and settling in the very critical areas of the lower portion of the column is maintained, and variations due to the amount of material or its water content are compensated for at the top of the column by the solvent vapor line 42. It should be noted that this vapor flow through line 42 is supplemented by flow through line 58 in accordance with the setting of valve 56. As mentioned earlier, this valve setting is controlled by the temperature in the transition section of the column at 46. The desired temperature for this control is a few degrees above the azeotropic boiling point.

GENERAL OBSERVATIONS

This invention relates to an oil extraction process which simultaneously removes both water and oil from natural materials such as vegetable materials, fish, animal materials, etc. It does so by contacting them with the vapors of water immiscible solvents under phase rule conditions of heterogenous azeotrope formation.

As such it not only solves many problems of feed preparation particularly of vegetable seeds and related feeds but it combines the subsequent removal of solvent from the product with the oil extraction process. Feed preparation depends on the nature of the feed.

Vegetable seeds such as peanuts, sesame, rapeseed, etc. that have not been denatured by prior processing, are fine-ground to approximately 20 to 60 mesh, mixed with water to give a heavy paste with a PH in the range of 6 to 8.5 and extruded through a die directly into the extractor.

Seeds such as dry process corn germ which have been denatured require the addition of a binder such as starch prior to mixing with water and extrusion.

Rendering materials merely require grinding before being fed to the extractor.

Some materials such as poultry offal or fish, such as menhaden, require no treatment at all. However, steam economy usually requires pre-drying.

The feed to the unit should have a constant weight on a dry basis.

MISCELLA POOL

The top section of the column has for its function the removal of unbound water from the material. It is larger than any of the sections below it and usually requires several times as much vapor as that supplied to the stacked sections below it. All of the solvent condensed in the lower sections along with oil it has removed accumulates in a pool on this top plate.

The rate at which vapor is supplied at a point below the top plate via slots in it is regulated to maintain a temperature of the solids discharged from it at a level slightly above the azeotropic boiling temperature of the solvent used with water. At that temperature the vapor pressure exerted by water in the solids is slightly less than that of unbound water; hence near the upper limit of bound water in the material.

The large flow of vapor through the slots plus the agitation produced as water is driven from the pool produces a great deal of turbulence. The extruded vegetable material in spaghetti-like strings is broken up by it and is formed into a generally spherical shape. At the same time, the agglomeration is hardened by the drying effect of the azeotropic action.

A relatively clear miscella is drawn from the pool via an outlet external to the extractor through a vibrating screen at an elevation such that it maintains a preset level in the pool. Glaze formation on the screen is avoided by avoiding the presence of a heterogenous azeotrope there by the introduction of a gas, or by the introduction of a small amount of super heated steam.

Foaming in the pool is discouraged by the maintenance of a 6 to 8" level of solid particles on the top plate.

As at all other plates in the column except the discharge, a flat rotating valve 1/16 to ¼ inches above the slots covers a small portion of them at any instant. By doing so it reduces the velocity of vapor through those, below their terminal velocity and they drop into the section below. These particles are joined by any fines from the underflow of a liquid cyclone in the miscella discharge line and later are trapped on the still somewhat glutinous surface of the larger particles, or carried back by entrainment into the pool above for the same purpose.

The vapors are passed upward through a series of stacked beds of relatively fine solids at a rate which produces fluidization of the solids and a "flooding" condition in the column which moves the miscella upward to a pool on the top plate.

The vapor is distributed over the beds to suit the function of each of the three sections of the column by fixing the free area of the perforated plates at the bottom of each bed and the number of perforations in each.

The resulting velocity at each perforation limits the size of particle that will settle downwards through it. This limit is the size, shape, density and other factors which determine the terminal velocity of the particle.

The problem is greatly reduced by the control on the top plate which reduces the dehydrating load to a constant and therefore the vapor requirement to the more or less constant quantity required to remove only bound water in the material fed.

The velocity of vapor so supplied is sufficient to support most of the solid particles at the perforations at the slots. These are moved through the perforations as a valve rotates over them momentarily reducing the vapor velocity there below the terminal velocity of the particles, allowing them to settle.

THE EXTRACTION SECTION

The extraction section is located directly below the pool section. It has the function of removing oil via a combination of azeotropic dehydration of bound water and by diffusion of liquid solvent into the structure of the solids. Both are processes which require staging and time.

Perfect staging would expose the solids moving from a bed above to thorough mixing with vapor of lower water content and miscella of a lower oil for a time sufficient to reach equilibrium before they are passed to the plate below. To obtain thorough mixing, the vapor velocity in the beds should be the highest compatible with the limitation of velocity at the perforations. On the other hand, a high velocity in the bed not only decreases the residence time of miscella and wash solvent in the beds but the quantity available for contact with the solids.

The number of stages (plates) required will be determined at least theoretically by the nature of the material (physical as well as degree of hygroscopy). In any case, this section will require more beds than any other part of the column. Its cross-sectional area in relation to the top section will be roughly in inverse ratio to that of unbound to bound water in the feed.

The superficial velocity through the beds must be sufficient to fluidize the beds and produce "flooding," but low enough to provide the liquid retention time to wash the oil from the solids. The temperature of each successive section will rise as water is evaporated from the solids by the azeotropic extraction process and should approach the boiling temperature of the solvent before discharge from this section.

Fresh solvent as a wash is introduced just above the bottom plate of the section to complete removal of oil from the solids before they drop into the desolventizing section directly below.

DESOLVENTIZING SECTION OF THE COLUMN

The solids with a low residual oil and water content drop into the section of decreased diameter where the superficial velocity of the vapor and therefore that through the interstices of the bed particles is greatly increased. The purpose here is to aid the desolventizing process by stripping liquid solvent from their surfaces. The action is furthered by the presence of considerable super heat in the vapor supplied.

Two characteristics of the section accomplish this end:

(1) It has the smallest cross-sectional area and, therefore, the highest superficial velocity of any part of the column. The friction drag of the vapor passing through interstices of the particles in the bed physically strips the liquid from their surface.

(2) The vapor supplied is super heated and aids the process by evaporation of part of the liquid.

To avoid interference of solids flow the diameter of the perforations and their free area are both enlarged.

The vapor velocity at the slots is made to be slightly lower than that in the previous extraction section by providing a greater amount of free area at each plate.

The moisture and solvent content and the rate of solids drawn from the column is controlled by sensing either the temperature or moisture content of the solids in the lowest bed of this section.

This section disposed directly under the extraction section provides means of removing the bulk of the liquid solvent retained on the solids as they leave the extraction section. The liquid is physically stripped from the solids by increasing the vapor velocity in the particle interstices to not only increase fluidization of the particles but to entrain the liquid from them. An increased vapor velocity at the slots, which would otherwise interfere with downward movement of the solids, is avoided by increasing the free area of the plates in this section.

Solvent removal is also aided by the introduction of superheated solvent vapor via the discharge section located directly below.

DISCHARGE SECTION

The bottommost section of the column consists of a single bed in which the trough of conveying means is part of the bottom plate. Superheated solvent vapor is supplied at very high slot velocities at a flow rate dictated by the dehydration load that is imposed on the sections of the column below the top plate.

The discharge section has two functions. One of these provides a means of introducing solvent vapor into a bed of finely divided solids. The bottom plate contains a very large number of relatively small perforations which produce a high slot velocity without excessive pressure drop. The holes are small enough to deliberately induce bridging when the vapor flow is cut off.

This section contains a means of removing solids from the column at a rate controlled to give temperature approaching the boiling point of the solvent in the top bed of the desolventizing section. Such a temperature indicates the approximate depletion of liquid solvent without reflecting that of the superheated vapor.

The discharge section contains means of removing solids from the extractor at a rate controlled from a sensing device located in the lowest bed of the desolventizing section. The temperature required is one within a few degrees of the boiling temperature of the solvent at the pressure existing at that point.

Solids are maintained upon the bottom plate by introducing the vapor to this, the lowest plate of the column, at very high slot velocity through holes of a diameter that induces bridging over them when the vapor flow is removed. There is no "valve" at this plate but an agitator is provided about 2" above this plate. Its purpose is to move solids into the discharge conveyor.

This section is isolated at the conveyor discharge from the flash desolventizing system by a sealing assembly such as the auger 106. A rotary valve (not shown) could also be used to provide a seal and a metering capability.

FLASH DESOLVENTIZING SYSTEM

The flash desolventizing system receives solids from the auger into its stream of superheated vapor which is at a temperature and quantity sufficient to remove all liquid solvent from the meal. This usually requires a temperature about 50° to 75° F. above the boiling point of the solvent and a ratio of solvent vapor to solids of at least 2.5 to 3.4# vapor to 1# solids at velocities in excess of about 60 to 78'/min. The solids are so transported by entrainment a distance of about 100 ft. to a cyclone separator or other separation means. Solids are discharged from the cyclone 118 via a rotary valve 120 to a deodorizing system.

The vapors augmented by additional vapors supplied as required by the temperature control, go to the top plate.

The later source of vapor is the evaporator which received liquid solvent over and above that in the miscella at the dictation of the control valve.

The oil solvent vapor is one which forms a system with one degree of freedom under the phase rule, and is water immiscible.

Also, feed to the column should contain a constant weight on a dry oil-free basis. The seed material should have a glutinous content. If the seed is denatured, it is necessary to add a binder, such as starch.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. An azeotropic oil extraction process, comprising the steps of:
    (a) continually feeding particles of oil-bearing protein material containing both bound and unbound water to the top of a vertical column which has a plurality of vertically spaced perforate plates containing small openings through which the protein material progressively settles downwardly creating a plurality of spaced beds of downwardly settling oil-bearing protein material,
    (b) passing a quantity of oil solvent vapor maintained at a temperature above the azeotropic boiling point upwardly through the column in sufficient volume to provide upward flow through the perforate plates counter-current to the downwardly settling oil-bearing protein material to carry fluids upwardly through the column without carrying the particles upwardly from one bed to another therewith,
    (c) assisting settling of the particles of oil-bearing protein material by periodically blocking upward vapor flow through the perforate plates at the bottom of the beds and immediately adjacent the surface of the plates with a blade,
    (d) maintaining the solvent vapor at a temperature above the azeotropic boiling point for the solvent and water during its entire passage upwardly through the column,
    (e) creating a turbulent miscella pool of oil, and liquid solvent above a relatively thin layer of particles disposed immediately above the top plate,
    (f) maintaining a vapor atmosphere above the liquid miscella pool of solvent and water immediately adjacent the top of the column into which the oil-bearing protein material is introduced,
    (g) supplying a liquid solvent at a point between the lowermost perforate plate and the top perforate plate,
    (h) withdrawing the miscella from the liquid miscella pool to separate the oil therefrom,
    (i) removing solvent and water vapor from the top of the column,
    (j) supplying additional solvent vapor to the column at an intermediate point in the column below and near the top plate at a volume which is dependent upon the azeotropic conditions in the column, and
    (k) withdrawing a de-oiled and dried protein material from the bottom of the column.

2. The azeotropic oil extraction process as set forth in claim 1, including the step of adjusting the supply of additional solvent vapor at a rate determined by the amount of unbound water in the oil-bearing protein material in the downwardly settling oil bearing protein material at a selected point.

3. An azeotropic oil extraction process, comprising the steps of:
    (a) continually feeding particles of oil-bearing protein material containing both bound and unbound water to the top of a vertical column which has a plurality of vertically spaced perforate plates containing small openings through which the protein material progressively settles downwardly creating a plurality of spaced beds of downwardly settling oil-bearing protein material,
    (b) passing a quantity of oil solvent vapor maintained at a temperature above the azeotropic boiling point upwardly through the column in sufficient volume to provide upward flow through the perforate plates counter-current to the downwardly settling oil-bearing protein material to carry fluids upwardly through the column without carrying the particles upwardly from one bed to another therewith,
    (c) maintaining the solvent vapor at a temperature above the azeotropic boiling point for the solvent and water during its entire passage upwardly through the column,
    (d) creating a turbulent miscella pool of oil, and liquid solvent above a relatively thin layer of particles disposed immediately above the top plate,
    (e) maintaining a vapor atmosphere above the liquid miscella pool of solvent and water immediately adjacent the top of the column into which the oil-bearing protein material is introduced,
    (f) withdrawing the miscella from the liquid miscella pool to separate the oil therefrom,
    (g) removing solvent and water vapor from the top of the column,
    (h) supplying additional solvent vapor to the column at an intermediate point in the column below and near the top plate at a volume which is dependent upon the azeotropic conditions in the column,
    (i) withdrawing a de-oiled and dried protein material from the bottom of the column, and
    (j) adjusting the supply of additional solvent vapor at a rate determined by the amount of unbound water in the oil-bearing protein material in the downwardly settling oil-bearing protein material at a selected point.

4. The azeotropic oil extraction process as set forth in claim 1 or 3, including the step of:
    (a) adjusting the volume of additional solvent vapor supplied to the column in accordance with temperature measurements of the column.

5. The azeotropic oil extraction process as set forth in claim 1 or 3, including the step of:

(a) maintaining the temperature in the column immediately below the top plate at a temperature value of within 10° F. above the azeotropic boiling point for the solvent by adjusting the supply of additional solvent vapor.

6. The azeotropic oil extraction process as set forth in claim 1 or 3, including the step of:
   (a) finely grinding seed material as a preliminary step and adding water to produce a thick slurry having a moisture content of unbound water of at least 10% and a ph value in the range of six to ten, and
   (b) forming the slurry into a semiplastic mass of thin plural threads of approximately one-eighth diameter which are then fed into the turbulent atmosphere at the top of the column.

7. The azeotropic oil extraction process as set forth in claim 1 or 3, including the step of:
   (a) maintaining the temperatures in the bottom of the column within 20% of the differential between the azeotropic boiling point and the normal boiling point of the solvent used.

8. The azeotropic oil extraction process as set forth in claim 1 or 3, including the step of:
   (a) removing the miscella through a screen assembly in which the moisture content is maintained at a high level to preclude glazing.

9. The azeotropic oil extraction process as set forth in claim 1 or 3, including the step of:
   (a) feeding the particles of oil-bearing material to the top of the column at a constant rate on a dry oil-free weight basis.

10. The azeotropic oil extraction process as set forth in claim 1 or 3, including the steps of:
    (a) supplying a stream of superheated vapor to a transport conduit which passes adjacent the bottom of the column,
    (b) feeding the solids from the bottom of the column into the transport conduit,
    (c) maintaining the temperature of the superheated vapor and the volume thereof at a sufficiently high level to remove any residual liquid solvent from the solid material, separating the dried material from the superheated vapor, and
    (d) carrying the superheated vapor after separation to the column where it is supplied to the intermediate point of the column.

11. The azeotropic oil extraction process as set forth in claim 1 or 3, including the step of:
    (a) applying an inert gas to the screen assembly through which the miscella is removed from the column to thereby preclude glazing due to drying of soluble protein material on the screen.

* * * * *